(12) United States Patent
Boulton

(10) Patent No.: US 10,468,063 B1
(45) Date of Patent: Nov. 5, 2019

(54) METHODS AND SYSTEMS FOR DETECTING HIDDEN SECTORS IN A HARD DRIVE

(71) Applicant: BlackBerry Limited, Waterloo (CA)

(72) Inventor: Adam John Boulton, Wirral (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/229,522

(22) Filed: Dec. 21, 2018

(51) Int. Cl.
| | |
|---|---|
| *G11B 27/36* | (2006.01) |
| *G01R 33/12* | (2006.01) |
| *G11B 20/18* | (2006.01) |
| *G11B 20/12* | (2006.01) |

(52) U.S. Cl.
CPC ...... *G11B 20/1816* (2013.01); *G11B 20/1217* (2013.01); *G11B 27/36* (2013.01); *G11B 2020/1232* (2013.01); *G11B 2220/2516* (2013.01)

(58) Field of Classification Search
CPC ...... G11B 27/36; G11B 20/18; G01R 33/1207
USPC ......... 360/25, 31, 53, 77.04, 77.06; 324/212
See application file for complete search history.

(56) References Cited

U.S. PATENT DOCUMENTS 7,005,849 B2 *  2/2006  Tse .................... G11B 5/00
                                                       324/212

* cited by examiner

*Primary Examiner* — Nabil Z Hindi
(74) *Attorney, Agent, or Firm* — Rowand LLP

(57) ABSTRACT

Methods and systems for detecting hidden sectors in a hard drive. The method may include initiating a linear copy of the hard drive and, while the hard drive is being copied, capturing images of a platter and an actuator arm within the hard drive using an imaging device. The captured images are output and they indicate a range of movement of the actuator arm across the platter during the linear copy. Ranges of movement that fail to scan across the full expected size of the platter may be indicative of a modified partition record that maliciously hides a portion of the hard drive from the copy operation.

20 Claims, 4 Drawing Sheets

US 10,468,063 B1

METHODS AND SYSTEMS FOR DETECTING HIDDEN SECTORS IN A HARD DRIVE

FIELD

The present application generally relates to forensic analysis and, in particular, to forensic analysis of computer hard drives.

BACKGROUND

Computers often contain data stored on a non-volatile disk, like a hard disk. When conducting analysis of a computer, such as for forensic investigations, the contents of a hard disk may be read and copied for further investigation. To read a hard disk, software for copying the disk may rely on partition information specified by a partition table or other documents, such as a master boot record, or an equivalent. The master boot record is typically found in the first (or zero) sector on the hard disk.

In most cases it is possible to edit the master boot record to change the partition information. That leads to the possibility of malicious changes to the partition information to "hide" portions of the memory from read/copy operations that rely on that partition information. In this sense, the hard disk may have "hidden sectors" where data or code may be stored but that may not be accessible to an operating system or software attempting to read the hard drive.

It would be helpful to provide for methods and systems that, at least in part, address some of these shortcomings.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
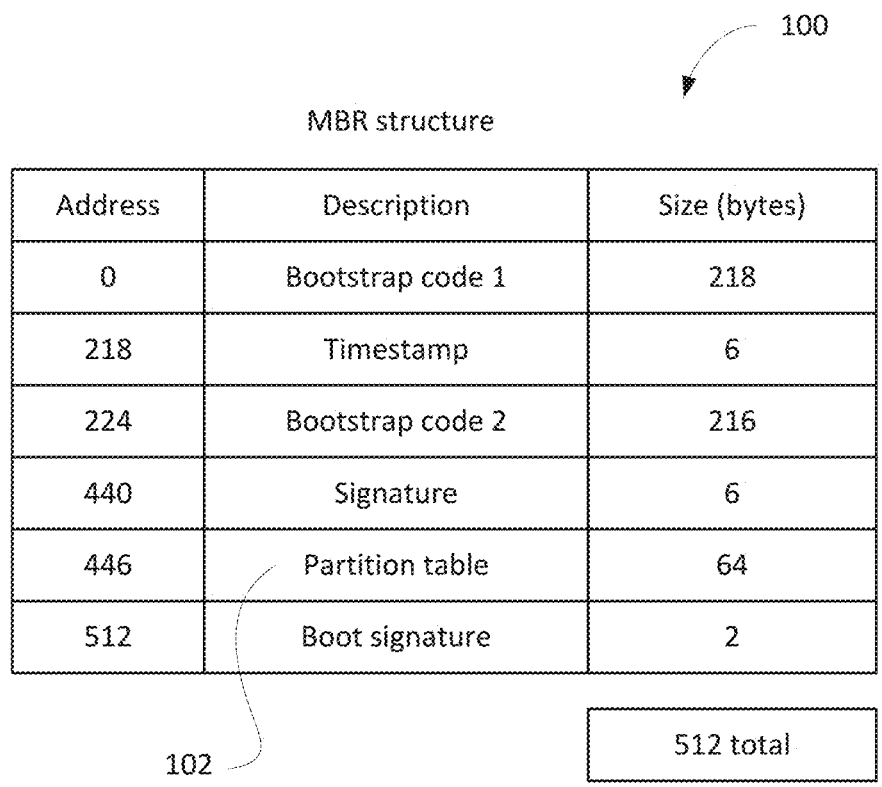
FIG. 1 shows an example of the structure of a master boot record.

In a first aspect, the present application describes a method of detecting hidden sectors in a hard drive. The method may include initiating a linear copy of the hard drive; while the hard drive is being copied, capturing images of a platter and an actuator arm within the hard drive using an imaging device; and outputting the captured images indicating a range of movement of the actuator arm across the platter during the linear copy.

In another aspect, the present application describes a system for detecting hidden sectors in a hard drive. The system may include a computing device to be coupled to the hard drive and containing a processor and processor-readable instructions to initiate a linear copy of the hard drive; and an imaging device to capture images of a platter and an actuator arm within the hard drive while the hard drive is being copied, and to output the captured images indicating a range of movement of the actuator arm across the platter during the linear copy.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Forensic analysis of computers typically involves accessing and reading stored data on a non-volatile disk. In the case of a hard disk, this may involve initiating a read and copy operation of the whole hard disk. This may be termed a "linear copy" in some cases. Then forensic analysis can take place on the copied version of the disk rather than risk damage to the original hard disk, which may need to be preserved for evidentiary purposes or other archival purposes.

To read a hard disk, software for copying the disk usually first reads a partition table or record, such as the master boot record, GUID (globally unique identifiers) Partition Table, or an equivalent, to determine the size and partitioning of the hard disk. In the present application, the term "partition record" will be understood to include any such record detailing the partitioning of a disk, including a master boot record, GUID Partition Table (which may be part of the Unified Extensible Firmware Interface (UEFI)), and may sometimes be referred to as the "partition sector", or the "master partition table" in some situations. Any references to the master boot record or the GUID Partition Table or the like are examples and should not be understood to limit the present application to those examples.

The partition record is a small bit of data usually found in the first sector of a hard disk that instructs software as to the partitioning of the hard disk. In may further include some code, such as a small program to read a boot record for an operating system, or other basic code for initiating or initializing basic input/output functions and/or the operating system.

FIG. 1 illustrates, in table form, an example master boot record (MBR) 100. The example MBR 100 includes two portions allocated for bootstrap code, a timestamp, signature areas, and a partition table 102. The partition table 102 details partition length and start addresses for the hard disk. It will be appreciated that the example MBR 100 is only illustrative and that MBRs having other forms or formats may be used in other implementations.

If the partition table 102 is modified, it may prevent software from accessing portions of the hard disk since the software will rely on the information in the partition table 102 to define the usable or accessible areas of the hard drive. In this sense, modifications to the partition table 102 may create "hidden sectors" or secret parts of the hard drive where data or code may be stored but may not be accessed by an operating system or software attempting to read the hard drive. This may be done for malicious and, possibly, illegal reasons to hide data from forensic review.

Figure 2:
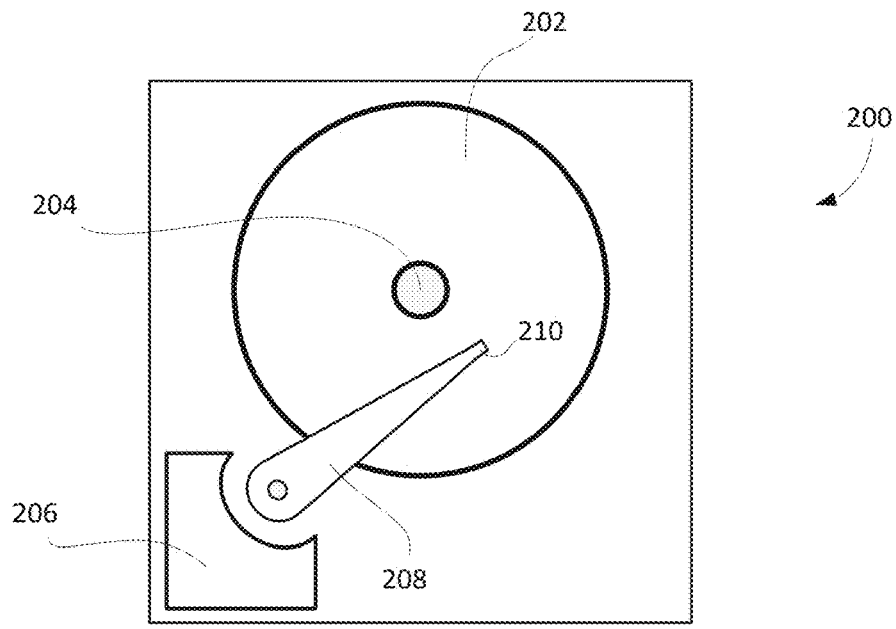
FIG. 2 diagrammatically illustrates an example hard drive.

Reference is now made to FIG. 2, which diagrammatically shows a simplified example of a hard drive 200. The hard drive 200 includes one or more platters 202 held and rotated by a spindle 204. The platter 202 typically is formed from a non-magnetic substrate coated with a very thin layer of magnetic material. Data is stored through magnetization of the magnetic material. An actuator 206 controls rotation of an actuator arm 208 on the end of which is a read-write head 210 for detecting magnetic transitions and altering magnetization in the platter 202. The actuator 206 includes a coil of wire (termed a "voice coil") between two magnets. Through control of the current in the voice coil, the rotation of the actuator arm 208 is controlled. Like a turntable, this rotation of the actuator arm 208 moves the head 210 across the platter 202, which rotates at high speed, allowing the head 210 to read or write to any point on the platter.

Figure 3:
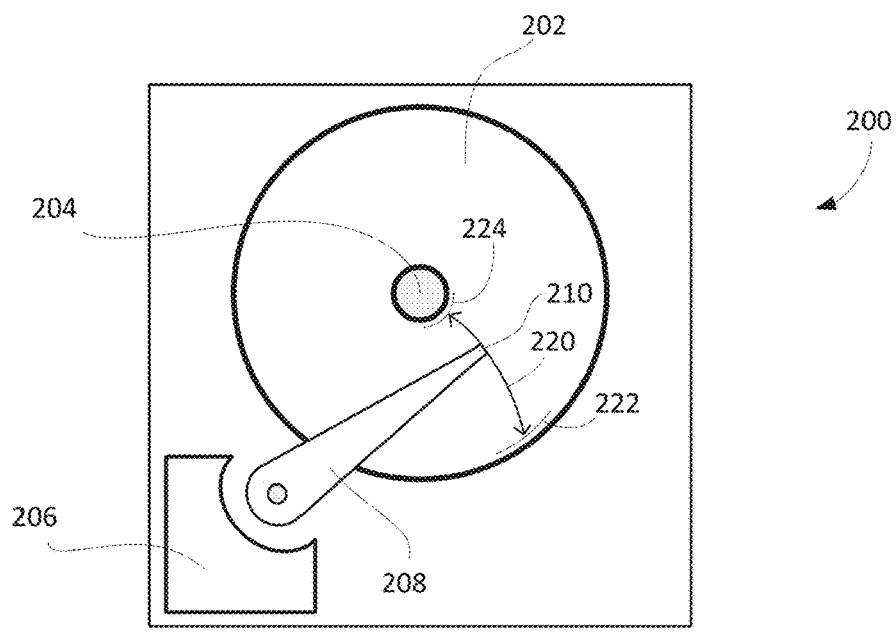
FIG. 3 diagrammatically illustrates an example range of travel for a read-write head of an actuator arm in a hard drive.

FIG. 3 shows the example hard drive 200, including the actuator arm 208 and the platter 202. The arc over which the read-write head 210 travels is indicated by reference numeral 220. To access the full readable or writable portion of the platter 202, the arc 220 spans the distance between an inner bound 224 and an outer bound 222. The inner bound 224 and outer bound 222 may not represent the full physical extent of the platter 202 since there may be a guard band portion at either end of the platter 202 in which data cannot be written or read.

Figure 4:
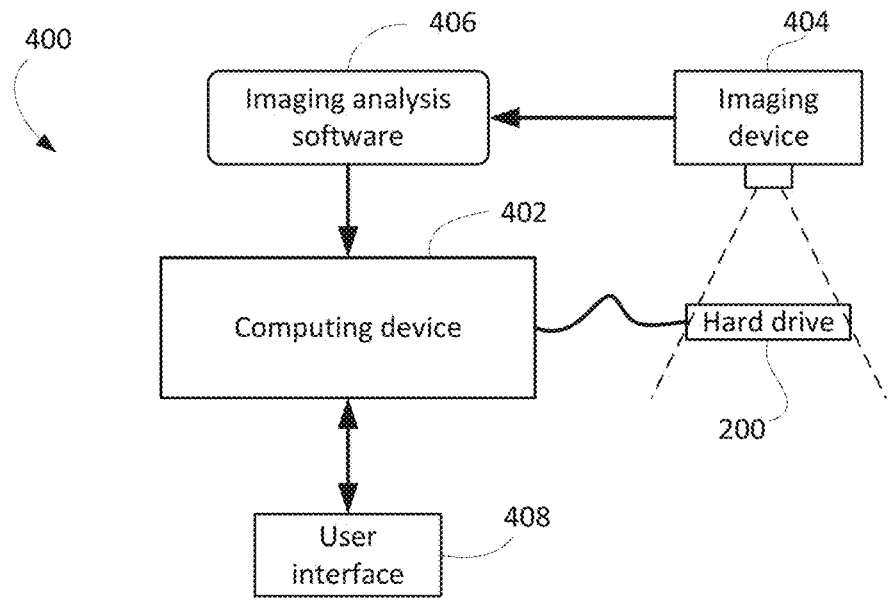
FIG. 4 shows, in block diagram form, one example of a system for detecting hidden sectors in a hard drive.

Reference is now made to FIG. 4, which shows a block diagram of one example of a system 400 for identifying hidden sectors when scanning a hard drive. The hard drive 200 is connected to a computing device 402 through a suitable connection, such as an IDE or SATA connector or the like. The computing device 402 contains a processor and suitable memory containing processor executable instructions, such as a computer program that, when executed, initiates reading and storing of a linear copy of the hard drive 200. Various types of computing devices 402 and drive copying software will be familiar to those ordinarily skilled in the art. The computing device 402 may include a user interface 408 for receiving user input and providing output. The user interface 408 may include a mouse, keyboard, touch screen, display screen, additional devices, or any combination thereof.

The system 400 further includes an imaging device 404 positioned so as to image the hard drive 200. In particular, the imaging device 404 is a penetrating imaging device capable of imaging components within the hard drive 200 while the hard drive 200 is being copied so as to observe the movement of the hard drive 200 actuator arm without interfering with the data stored on the hard drive 200 or compromising operation of the hard drive 200. In one example implementation, the imaging device 404 includes an ultrasound scanner. The ultrasound scanner may produce a series of ultrasound images (e.g. sonograms) of the internal mechanism of the hard drive 200. In some implementations, the ultrasound scanner may output a video of the hard drive 200 while the hard drive 200 is being copied, where the video is a time series of sonograms. In other implementations, other imaging devices may be used, such as x-ray machines or other such imaging devices capable of imaging components within the hard drive 200 without the necessity of opening the hard drive 200 to view the components directly.

In some implementations, the imaging device 404 may be coupled to and act under instructions from the computing device 402. For example, the computing device 402 may cause the imaging device 404 to capture images of the hard drive 200 at certain points during the linear copying operation. As an example, one or more images may be captured at or around the time the copying operation begins. The actuator arm may be expected to first be positioned at the zero sector to read the master boot record. It may then be expected to move to the first sector of the first partition based on the data found in the master boot record, and then to move linearly as it scans through the full partition(s) until it reaches the end of the last partition. It may be advantageous to have at least an image of the actuator arm when it starts at the first sector of the first partition and an image of the actuator arm when it ends at the last sector of the last partition. From this image data, it can be determined whether the actuator arm and, specifically, the read-write head, starts at or near the outer bound of the platter and ends at or near the inner bound of the platter, such that it scans the entire field of the platter during the copy operation. It would be further advantageous to have a series of images of the actuator arm over the course of the copy operation to assess its progress across the surface of the platter during the copy operation. In some cases, the series of images may be a video of real-time ultrasound scan data showing the position of the actuator arm relative to the platter.

In some implementations, imaging analysis software 406 may receive the image data from the imaging device and determine whether the actuator arm traversed the full field of the platter during the course of the copy operation. As the read-write head may skip certain bad sectors indicated by the master boot record, the imaging analysis software 406 may not require that the read-write head traverse every track and sector of the platter, but that it not skip over portions of a certain threshold size. In the case of a maliciously modified master boot record that hides sectors, the partition data is likely to cause the actuator arm to miss a substantial portion of the platter at the beginning or the end of its normal range of motion by misidentifying the start or end address for partitions. Nevertheless, in some cases, it may be possible that maliciously hidden sectors form a substantial portion of the platter between otherwise accessible portions of the platter. Therefore, the imaging analysis software 406 may be configured to identify whether the actuator arm and, specifically, the read-write head miss at least a threshold portion of the platter in the course of the scan.

FIG. 4 shows the imaging analysis software 406 as a standalone element for clarity of discussion but it will be appreciated at that the imaging analysis software 406 may be implemented within the imaging device 404, within the computing device 402, or within a separate computing device.

The imaging analysis software 406 may cause output of hidden sector data. The hidden sector data may specify whether the hard disk 200 appears to have hidden sectors based on the analyzed ultrasound data. The hidden sector data may, if hidden sectors are identified, indicate the size and/or location of the hidden sectors, e.g. whether they are at the beginning or end of the scan, or elsewhere, and the size or percentage of the disk space that appears to be hidden.

Figure 5:
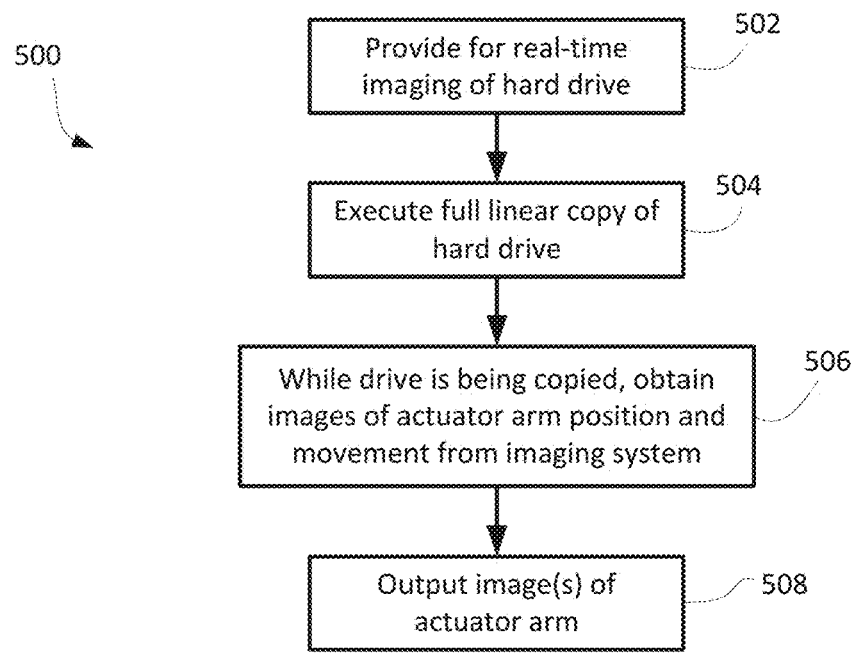
FIG. 5 shows, in flowchart form, one example of a method of detecting hidden sectors in a hard drive.

Reference will now be made to FIG. 5 that shows, in flowchart form, one example method 500 of detecting hidden sectors in a hard drive. The method 500 includes providing for real-time imaging of the hard drive in operation 502. In particular, operation 502 involves providing for an imaging device or imaging system capable of imaging components within the hard drive without the necessity of opening the hard drive. As noted above, in one example implementation the imaging device is an ultrasound scanner.

In operation 504, a full linear copy of the hard drive is initiated. This may include executing a command or other processor-readable instructions triggering the linear copy, such as by way of copying software. The copying software may be executed on a processor (or processors) of a computing device coupled to the hard drive by way of a wired connection. The copying software may cause the reading of the master boot record and the consequent copying of all partitions specified in the master boot record.

In the course of the copying, as indicate by operation 506, the imaging device captures one or more images of the hard drive and, in particular, the actuator arm position relative to the platter within the hard drive.

In this example method 500, the images captured by the imaging device are output to indicate the position of the actuator arm relative to the platter at the time of initiating the linear copy, i.e. at the first sector, and at the time of ending the linear copy, i.e. at the last sector. In some cases, addition images between the first and last may be output. In some cases, a live real-time video may be displayed during the scan. From these images, it may be visually determined whether the actuator arm traverses its full range across the platter. Hidden sectors may be identified based on the actuator arm missing a substantial portion of the platter during the copy operation.

Figure 6:
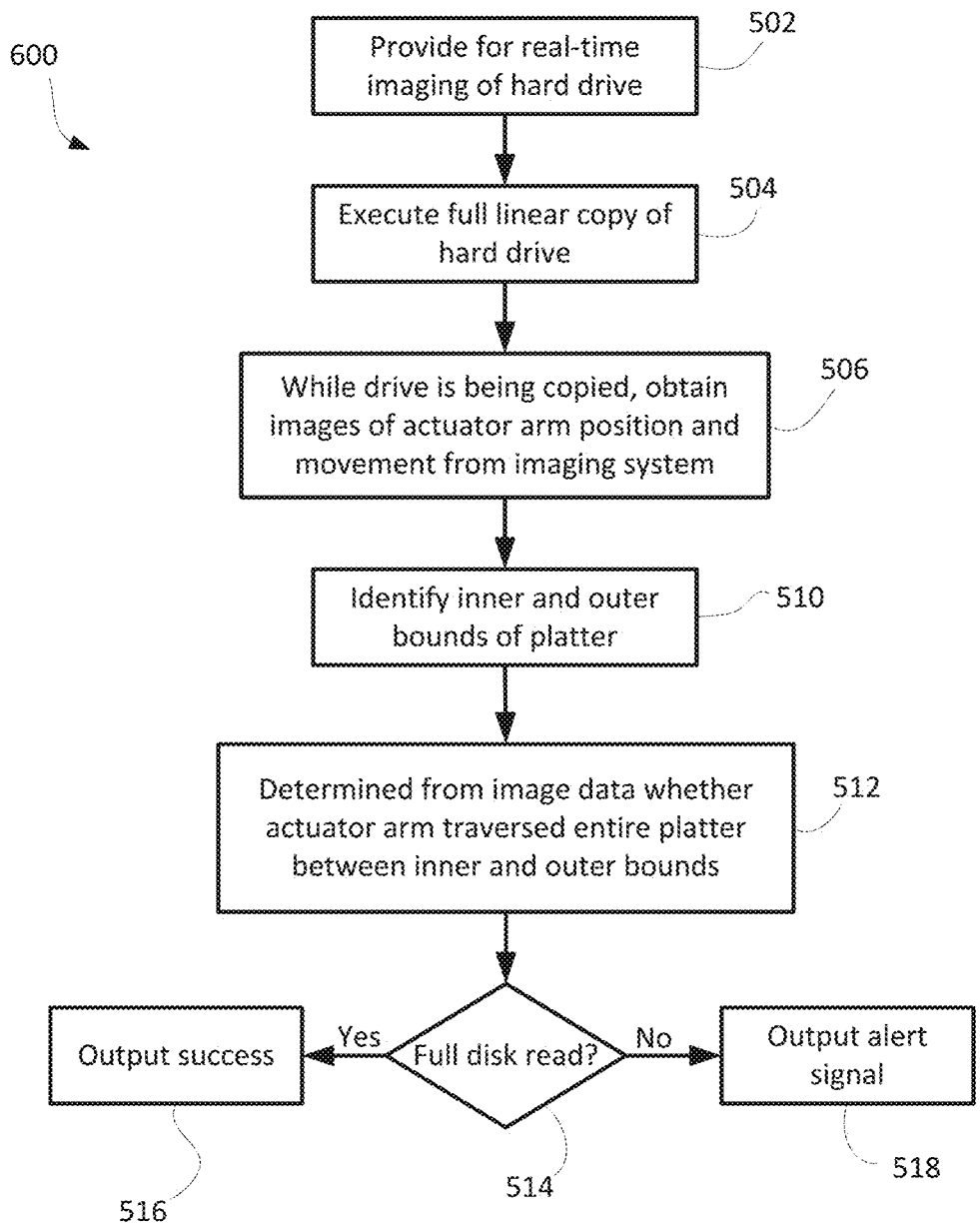
FIG. 6 shows another example of a method of detecting hidden sectors in a hard drive.

Reference is now also made to FIG. 6, which shows a further example method 600 of identifying hidden sectors. Operations 502, 504 and 506 are as described above. As indicated by operation 510, inner and outer bounds of the platter are identified. In some instances, these may be specified by a hard drive manufacturer as the readable/writable portion of the platter. The inner bound may be set at a preselected distance from the inner edge of the platter, e.g. a specified distance from the outer edge of the spindle. The outer bound may be set at a preselected distance from the outer edge of the platter. The inner bound and outer bound are selected to indicate the inner and outer points, respectively, of the readable and/or writable portion of the platter that the read-write head would normally access in the course of a full linear copy of the full capacity of the platter.

In operation 512, using the image data from the imaging device it is determined whether the actuator arm has traversed the full range of its motion in the course of the linear copy between its inner bound and its outer bound. Operation 512 may include determining from the image data whether the read-write head traversed the full range of its arc from outer bound to inner bound during the copy operation. In some instances, the determining may include identifying any jumps by the read-write head from one track to another non-adjacent track of the platter. The magnitude of the jump may be compared to a threshold size jump indicative of skipped hidden sectors. For example, a jump larger than 5%, 10%, 20% or more of the platter width may be identified as indicative of hidden sectors. Other percentages or absolute values may be specified in setting a suitable threshold for a given implementation.

In operation 514, the system assesses whether the determination in operation 512 indicates hidden sectors. If not, then in operation 516 the system output an indication of a successful copy operation. If so, then in operation 518, the system outputs an alert indicating potential hidden sectors.

The output of the alert may include a sound or visual indication and may include outputting data regarding the size and/or location of the potential hidden sectors identified in operation 512. It may further include outputting some or all of the image data.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of detecting hidden sectors in a hard drive, the method comprising:
   initiating a linear copy of the hard drive;
   while the hard drive is being copied, capturing images of a platter and an actuator arm within the hard drive using an imaging device; and
   outputting the captured images indicating a range of movement of the actuator arm across the platter during the linear copy.

2. The method of claim 1, further comprising:
   identifying an inner bound and an outer bound on the platter; and
   determining from the captured images that the range of movement of the actuator arm does not span the distance between the inner bound and the outer bound and, as a result, outputting an alert signal indicating hidden sectors.

3. The method of claim 2, wherein determining that the actuator arm failed to read the platter includes determining that the actuator arm began its range of movement at a point at least a threshold distance inside of the outer bound.

4. The method of claim 2, wherein determining that the actuator arm failed to read the platter includes determining that the actuator arm finished its range of movement at a point at least a threshold distance before reaching the inner bound.

5. The method of claim 1, wherein the range of movement of the actuator arm includes the range of travel of a read-write head on the actuator arm in an arc across the platter during the linear copy.

6. The method of claim 1, wherein capturing images includes capturing ultrasound images.

7. The method of claim 1, wherein capturing images include capturing x-ray images.

8. The method of claim 1, wherein outputting the captured images indicating a range of movement of the actuator arm across the platter includes outputting a video showing the range of movement of the actuator arm during the linear copy of the hard drive.

9. The method of claim 1, wherein initiating the full copy of the hard drive includes executing a copy instruction that causes read of a partition record stored on the hard drive, and wherein the partition record provides partition data, and wherein the range of movement of the actuator arm during the linear copy is governed by the partition data read from the partition record.

10. The method of claim 9, wherein the partition record includes one of a master boot record or a GUID partition table.

11. A system for detecting hidden sectors in a hard drive, the system comprising:
    a computing device to be coupled to the hard drive and containing a processor and processor-readable instructions to initiate a linear copy of the hard drive; and
    an imaging device to capture images of a platter and an actuator arm within the hard drive while the hard drive is being copied, and to output the captured images indicating a range of movement of the actuator arm across the platter during the linear copy.

12. The system of claim 11, further including memory storing processor-executable instructions that, when executed by the processor, cause the processor to:
    identify an inner bound and an outer bound on the platter; and
    determine from the captured images that the range of movement of the actuator arm does not span the distance between the inner bound and the outer bound and, as a result, output an alert signal indicating hidden sectors.

13. The system of claim 12, wherein the processor-executable instructions, when executed by the processor, are to cause the processor to determine that the actuator arm failed to read the platter by determining that the actuator arm began its range of movement at a point at least a threshold distance inside of the outer bound.

14. The system of claim 12, wherein the processor-executable instructions, when executed by the processor, are to cause the processor to determine that the actuator arm failed to read the platter by determining that the actuator arm finished its range of movement at a point at least a threshold distance before reaching the inner bound.

15. The system of claim 11, wherein the range of movement of the actuator arm includes the range of travel of a read-write head on the actuator arm in an arc across the platter during the linear copy.

16. The system of claim 11, wherein the imaging device includes an ultrasound device.

17. The system of claim 11, wherein the imaging device includes an x-ray device.

18. The system of claim 11, wherein the processor-executable instructions, when executed by the processor, are to cause the processor to output the captured images indicating a range of movement of the actuator arm across the platter by outputting a video showing the range of movement of the actuator arm during the linear copy of the hard drive.

19. The system of claim 11, wherein the processor-readable instructions, when executed, are to initiate a linear copy of the hard drive by executing a copy instruction that causes read of a partition record stored on the hard drive, and wherein the partition record provides partition data, and wherein the range of movement of the actuator arm during the linear copy is governed by the partition data read from the partition record.

20. The system of claim 19, wherein the partition record includes one of a master boot record or a GUID partition table.

* * * * *